(12) United States Patent
Arslan

(10) Patent No.: US 12,078,207 B2
(45) Date of Patent: Sep. 3, 2024

(54) PRODUCTION ASSEMBLY AND METHOD FOR HYBRID COMPOSITE DRIVESHAFT TUBE

(71) Applicant: TIRSAN KARDAN SANAYI VE TICARET A.S., Manisa (TR)

(72) Inventor: Gizem Arslan, Izmir (TR)

( * ) Notice: Subject to any disclaimer, the term of this patent is extended or adjusted under 35 U.S.C. 154(b) by 733 days.

(21) Appl. No.: 17/276,210

(22) PCT Filed: Jun. 22, 2019

(86) PCT No.: PCT/TR2019/050486
§ 371 (c)(1),
(2) Date: Mar. 15, 2021

(87) PCT Pub. No.: WO2020/060511
PCT Pub. Date: Mar. 26, 2020

(65) Prior Publication Data
US 2022/0025922 A1 Jan. 27, 2022

(30) Foreign Application Priority Data
Sep. 21, 2018 (TR) .................. 2018/13603

(51) Int. Cl.
*F16C 3/02* (2006.01)
*B29C 53/58* (2006.01)
*B29K 307/04* (2006.01)
(Continued)

(52) U.S. Cl.
CPC ............ *F16C 3/026* (2013.01); *B29C 53/583* (2013.01); *B29K 2307/04* (2013.01);
(Continued)

(58) Field of Classification Search
CPC ........ B29C 53/583; F16C 3/026; F16C 7/026; F16C 2208/02; F16C 2208/04; F16C 2220/28; F16C 2326/06
(Continued)

(56) References Cited

U.S. PATENT DOCUMENTS 3,651,661 A * 3/1972 Darrow .................. F16C 3/026
464/181
4,089,190 A * 5/1978 Worgan .................. F16C 3/026
464/181
(Continued)

FOREIGN PATENT DOCUMENTS

DE     102007018082 A1 * 10/2008 .............. F16C 3/026
EP         0222660 A1 *  5/1987 .............. F16C 3/026
(Continued)

OTHER PUBLICATIONS

PCT/TR2019/050486 , "International Search Report and Written Opinion", Apr. 22, 2020, 8 pages.

*Primary Examiner* — Josh Skroupa
(74) *Attorney, Agent, or Firm* — Egbert, McDaniel & Swartz, PLLC

(57) ABSTRACT

A driveshaft has an elongated monolithic composite tube with a front joint at one end thereof and a rear joint at an opposite end thereof. The tube has an inner layer formed of glass fibers coaxially wound on top of one other. The tube has outer layer wound directly on the inner layer. The outer layer is formed substantially of carbon fibers. A ratio of a thickness of the outer layer to the thickness of the inner layer is between 0.8 and 1.2.

5 Claims, 6 Drawing Sheets

(51) Int. Cl.
*B29K 309/08* (2006.01)
*B29L 31/00* (2006.01)

(52) U.S. Cl.
CPC ....... *B29K 2309/08* (2013.01); *B29L 2031/75* (2013.01); *F16C 2208/04* (2013.01); *F16C 2220/28* (2013.01); *F16C 2240/60* (2013.01); *F16C 2326/06* (2013.01)

(58) Field of Classification Search
USPC .................................................. 464/181, 183
See application file for complete search history.

(56) References Cited

U.S. PATENT DOCUMENTS

| | | | | |
|---|---|---|---|---|
| 4,171,626 A * | 10/1979 | Yates | .................... | F16C 3/026 464/181 |
| 4,362,521 A * | 12/1982 | Puck | .................... | F16C 3/026 464/181 |
| 4,367,189 A * | 1/1983 | Davies | .................... | F16C 3/026 156/173 |
| 4,863,416 A * | 9/1989 | Gupta | .................... | F16C 3/026 464/181 |
| 5,443,099 A * | 8/1995 | Chaussepied | .......... | F16L 47/24 138/139 |
| 5,447,390 A * | 9/1995 | Sparks | .................... | F16L 9/12 405/195.1 |
| 5,683,300 A * | 11/1997 | Yasui | .................... | F16C 3/026 464/181 |
| 7,731,593 B2 * | 6/2010 | Dewhirst | ................ | F16C 3/026 464/181 |
| 8,246,478 B2 * | 8/2012 | Schreiber | ................ | F16C 3/026 464/181 |
| 8,251,830 B2 * | 8/2012 | Schreiber | ................ | F16C 3/026 464/181 |
| 8,783,300 B2 * | 7/2014 | Hahn | .................... | F16L 11/086 138/144 |
| 8,904,904 B2 * | 12/2014 | Stewart | .................... | F16C 7/026 74/579 R |
| 10,344,794 B2 * | 7/2019 | Slesinski | ................. | F16C 3/026 |
| 2015/0060594 A1 | 3/2015 | Nguyen et al. | | |
| 2018/0142726 A1 | 5/2018 | Slesinski et al. | | |

FOREIGN PATENT DOCUMENTS

| | | | | |
|---|---|---|---|---|
| EP | 0361639 A2 * | 4/1990 | .............. | F16C 3/026 |
| GB | 2017260 | 10/1979 | | |
| GB | 2127938 | 4/1984 | | |
| GB | 2146097 A * | 4/1985 | .............. | F16C 3/026 |
| JP | 59049923 A * | 3/1984 | .............. | F16C 3/026 |

* cited by examiner

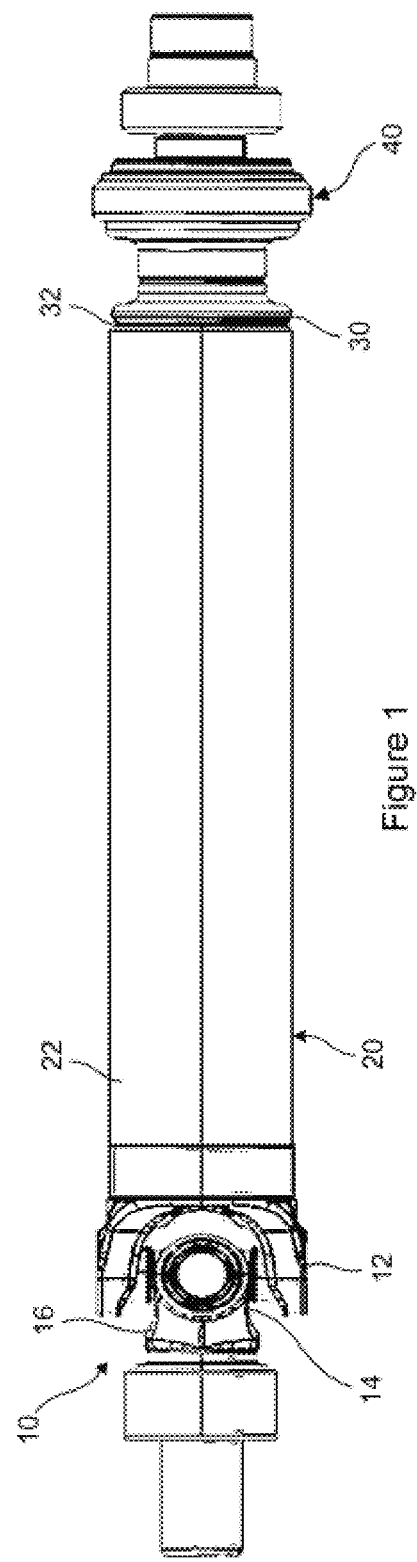

PRODUCTION ASSEMBLY AND METHOD FOR HYBRID COMPOSITE DRIVESHAFT TUBE

RELATED APPLICATIONS

This application is a U.S. National Phase of International Application No. PCT/TR2019/050486, filed Jun. 22, 2019, claiming priority to Turkish Patent Application No. 2018/13603, filed Sep. 21, 2018, contents of which are hereby incorporated by reference in their entirety.

TECHNICAL FIELD

The present invention relates to a fiber-reinforced polymeric driveshaft tube and a method of manufacture thereof.

PRIOR ART

It is known that the shafts of the means may be formed in part by lightweight fiber reinforced plastic tubes in order to reduce weight. Composite shafts of this type include metal connections bonded to both ends and tubing made of fiber-reinforced polymeric material. Conventional steel driveshafts are generally produced in two pieces to increase the fundamental natural bending frequency, since the natural bending frequency of a shaft is inversely proportional to the square of the beam length and is proportional to the square root of the specific module. For this reason, steel driveshafts are produced in two parts to increase the natural frequency of basic bending. The steel driveshaft consists of two parts connected by a support structure, bearings and U-shaped joints (intermediate bearing assembly), so the overall installation weight is higher. The main problem in using composite materials is the cost of the product.

GB2127938 patent publication discloses a composite driveshaft tube connected to a common driveshaft tube yoke. An inner layer of the tube consists of E glass type and fiberglass, which is made by winding the fiberglass on a suitable mandrel, in which the fibers wound in the tube are reinforced in the thermoset resin matrix, giving the required strength and resistance of the tube. This glass fiber is wound at a 45° angle to the longitudinal axis of the tube. The glass fiber is the main carrier of torsional loads on the tube. On the fiberglass layer, the carbon graphite fiber is arranged circularly surrounding the fiberglass layer and embedded in the thermoset resin matrix, adhering the external periphery of the fiberglass layer.

BRIEF DESCRIPTION OF THE INVENTION

The object of the invention is to effectively compensate for the torque loads of the fiber-reinforced driveshaft tube made of composite material.

To achieve the aforementioned objective, invention comprises a driveshaft comprising an elongated monolithic composite tube with a front joint having a tube yoke and a rear joint at a distance from the front joint both are provided at corresponding opposite ends. The driveshaft comprises an inner layer which is composed of carbon or glass fibers which are coaxially wound on top of each other and an outer layer wound directly on the inner layer and the ratio between the thickness of carbon fiber winding and glass fiber winding is bigger than 0.1. Carbon fiber winding ratio being greater than 0.1 provides a significant reduction compared to steel driveshafts, while the impact of the one-piece composite tube on the natural frequency of wounding is reduced so that it does not affect the operating parameters.

In a preferred embodiment of the invention, the outer layer of the composite tube is substantially composed of carbon fiber. Thus, the torque loads are effectively compensated by the carbon fibers. In an alternative embodiment, different polymeric fibers can be incorporated into the carbon fiber, or it is possible to coat the fibers with a resin or a different coating to reinforce the fibers.

In a preferred embodiment of the invention, the inner layer of the composite tube is substantially composed of glass fiber. Thus, the inner layer can be produced easily and quickly by winding the glass fiber in the form of a tube.

In a preferred embodiment of the invention, the ratio between the thickness of carbon fiber winding and the thickness of glass fiber winding is between 0.8-1.2. Thus, although extended, the fundamental bending frequency satisfies the values expected from a two-piece driveshaft. While doing so, the conventional shafts produced in two pieces are reduced to one piece and the connection between the two shafts is eliminated. This also improves weight and noise. Reducing the number of parts reduces composite driveshaft assembly time, inventory cost, and maintenance and component complexity. In addition, steel, aluminum driveshafts for longer drivelines with critical speed requirements of 7500 rpm and above are also designed to address severe design limitations.

In a preferred embodiment of the invention, the outer periphery of the composite tube is fully composed of the outer facing side of the outer layer. In this case, there is no need for a mixture of glass fiber and resin which is used to prevent the fibers from opening at high speeds. The outer layer of carbon fiber, which is easily formed by winding on the inner layer, is sufficient to achieve the axial stiffness expected from the driveshaft. Preferably, the fiber orientation is selected to be 45° for both carbon and glass fibers. In alternative embodiments, different fiber orientations can be selected.

In a preferred embodiment of the invention, the outer layer forming the outer periphery of the composite tube is composed of carbon or glass fiber. Thus, it has been found that the driveshaft, which is inevitable to be affected by the external environment, is strengthened by making it durable with glass fiber material.

In a preferred embodiment of the invention, the glass fiber is composed of zebra winding in the outer layer.

In a preferred embodiment of the invention, the outer layer of the cardan shaft tube is the composite tube selected from the group of carbon, glass or epoxy as a hybrid material. Thus, by using carbon fiber material, cost advantage is provided by keeping weight loss between 2-10% compared to known tubes. In addition, performance optimization is achieved by controlling the weight loss at maximum 5%.

To achieve the aforementioned objective, invention comprises the steps of providing an hollow cylindrical inner layer by fiber winding process reaching predetermined glass fiber winding thickness by merely winding glass fiber; reaching predetermined carbon fiber winding thickness with filament twisting process to the outer side of the inner layer until a composite tube is provided by fully twisting carbon fiber; securing a front joint and a rear joint along a connection part to corresponding ends respectively edges of the composite tube, is respectively. Hybrid composite driveshaft is obtained by filament winding process. High speed, for example 100 rpm or higher, the precise positioning of the continuous fiber in the proposed models forms the basis of the filament winding process. This allows the design to be adjusted to predetermined values for weight, torsional stiffness, axial stiffness, bending stiffness or other structural properties. Primarily, an unexpected decrease in noise values is obtained winding the glass fiber to form an inner layer and winding the carbon fiber over it.

In a preferred embodiment of the invention, the inner layer winding number and the outer layer winding number is arranged such that the glass fiber winding thickness and carbon fiber winding thickness is substantially equal to each other. Thus, it has been found that glass fibers and carbon fibers having different characteristic mechanical properties exhibit effective fatigue resistance compared to other composite rubes in which they are used together.

BRIEF DESCRIPTION OF THE FIGURES

FIG. 1 is a front view of a representative embodiment of the composite driveshaft of the present invention.

FIG. 3a is a detailed isometric view of FIG. 2a.

FIG. 3c is an isometric view of FIG. 2a.

DETAILED DESCRIPTION OF THE INVENTION

Figure 2A:
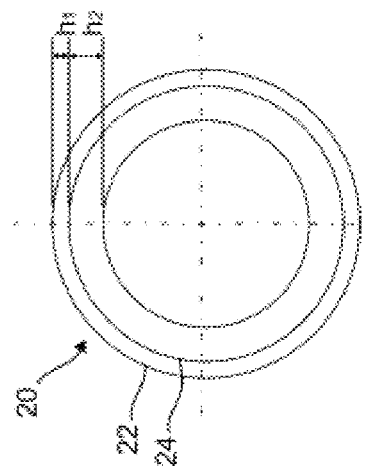
FIG. 2a is a cross-sectional illustration of the composite driveshaft shown in FIG. 1.

In this detailed description, the inventive subject matter has been described with reference for examples, such that there is no restriction and only to better describe the subject matter.

In FIG. 1, a driveshaft comprising a one-piece composite tube (20) is shown from the front. A tube yoke (12) is secured coaxially to the inner cavity of the composite tube (20) from one end by a known securing method, for example welding, shape bonding, etc. From the other end, a rear joint (40) is secured by a welding seam (32) circumferentially arranged on a connection part (30). A universal joint (14) on the tube toke (12) enables a flange yoke (16) to be attached to the composite tube (20) from the front joint (10).

Figure 2B:
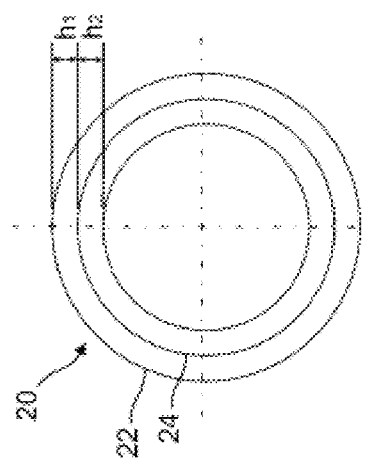
FIG. 2b is a cross-sectional illustration of a composite driveshaft with increased carbon layer thickness.
Figure 3A:
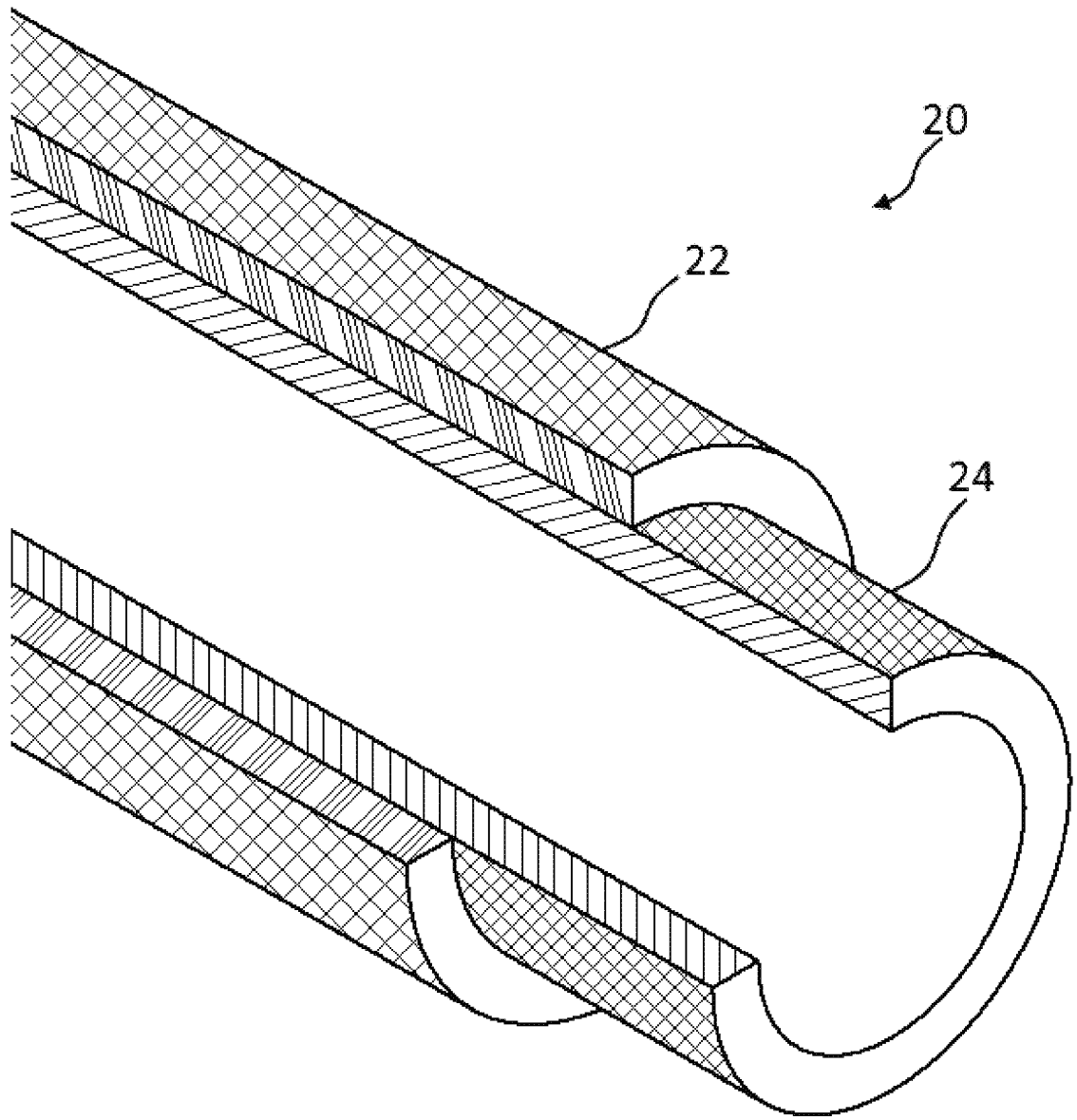
Figure 3B:
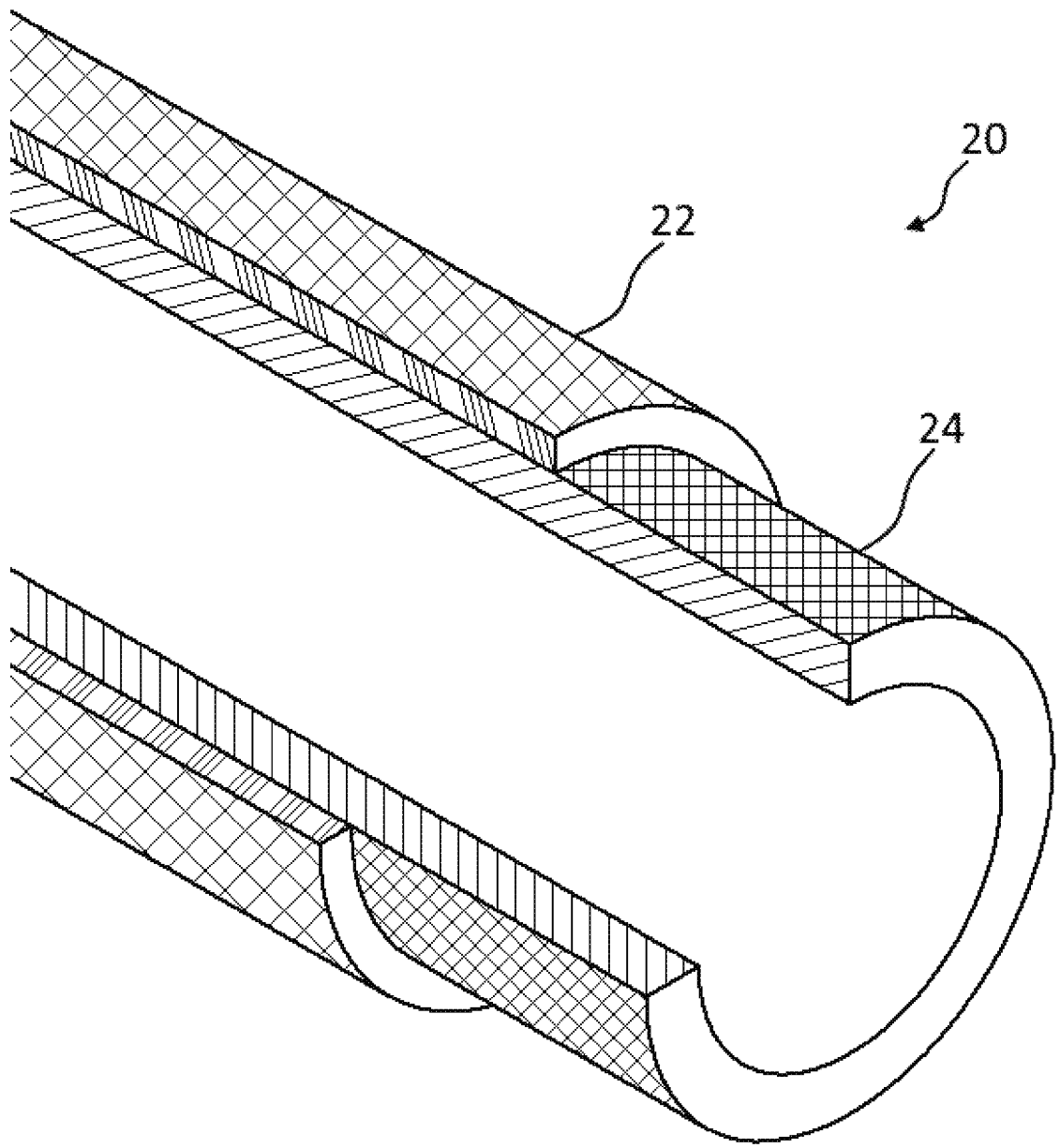
FIG. 3b is a detailed isometric view of FIG. 2b.
Figure 3C:
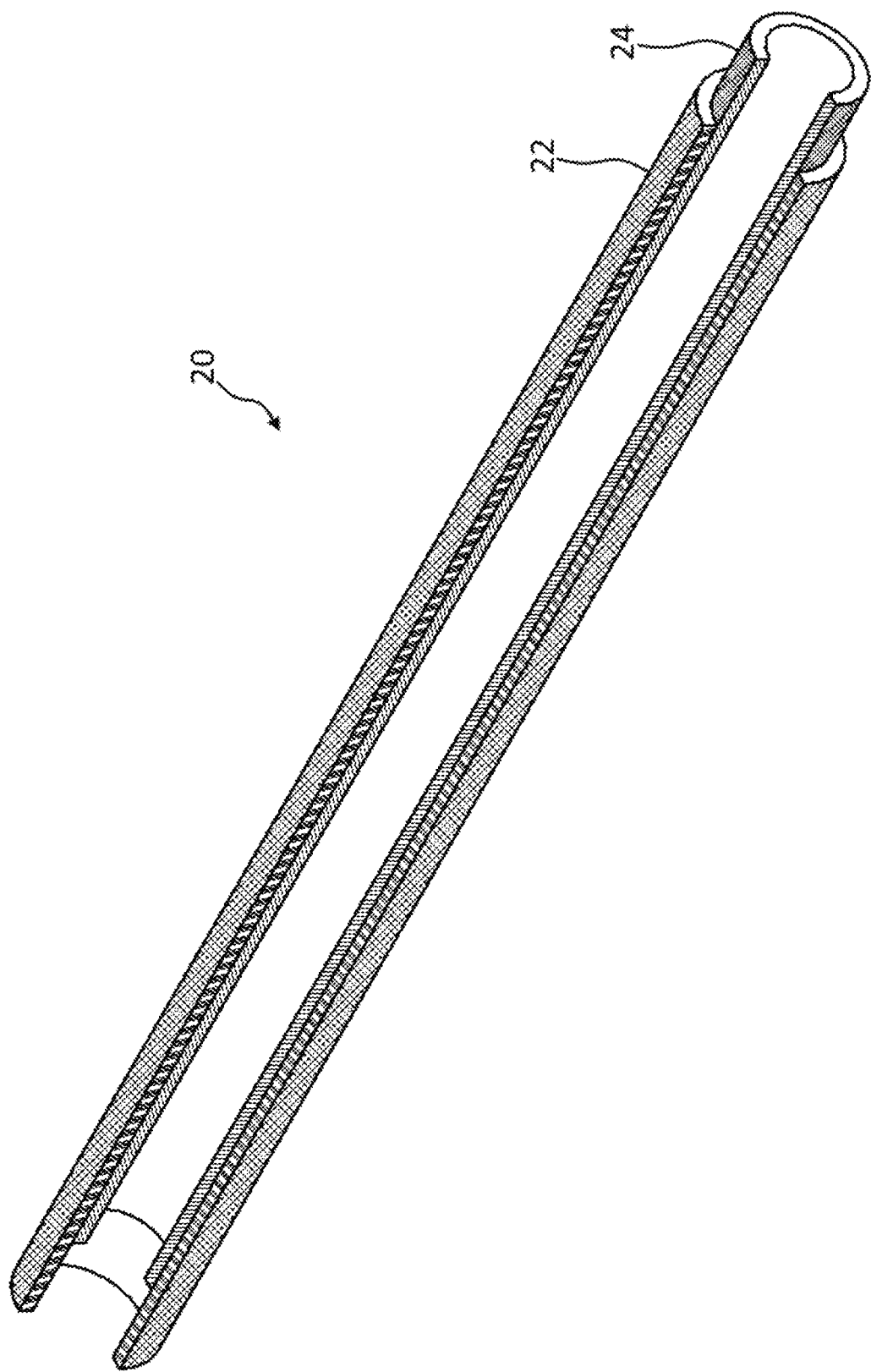
Figure 3D:
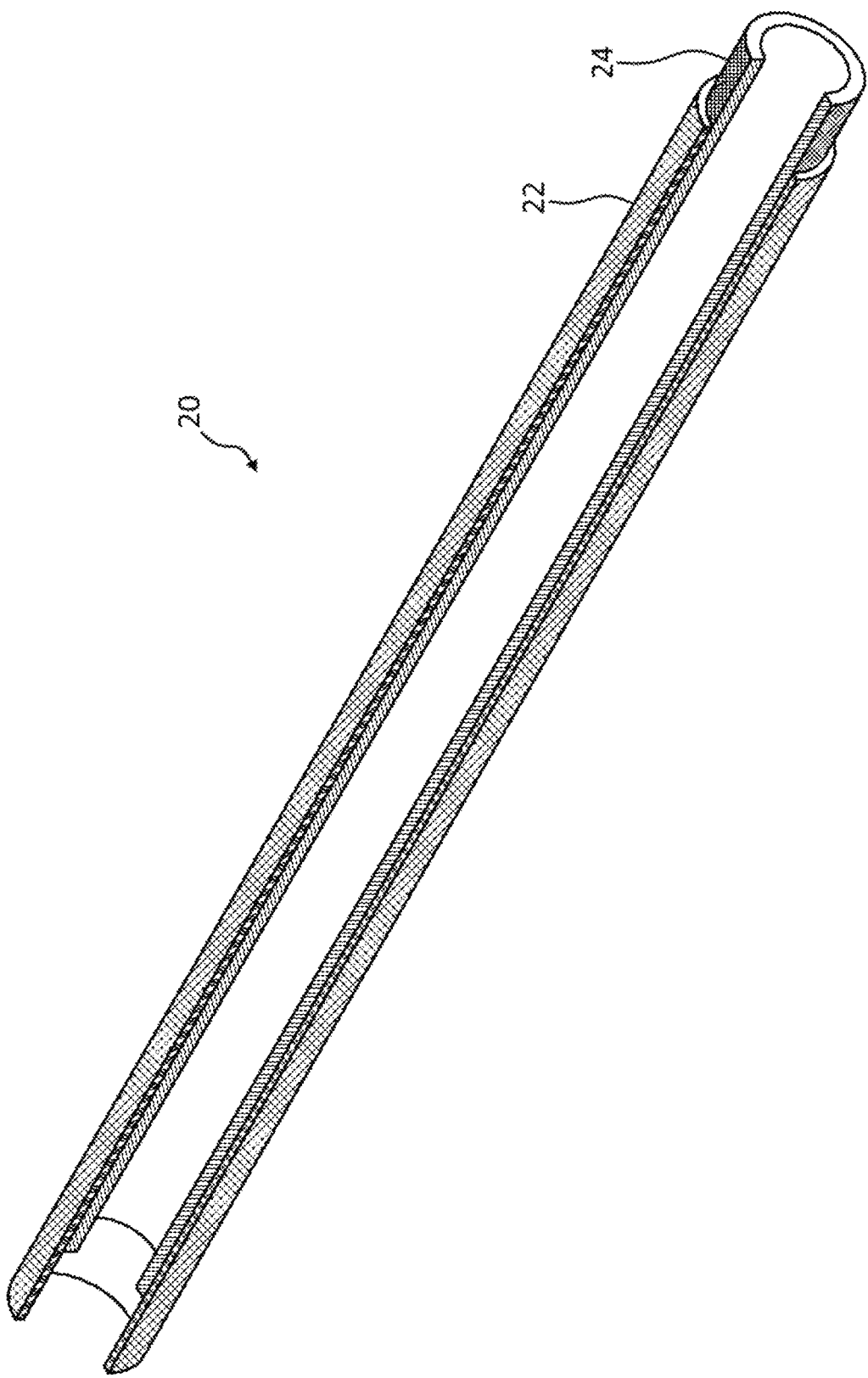
FIG. 3d is an isometric view of FIG. 2b.

In FIG. 2a, the composite tube (20) used in a driveshaft is shown in cross-section. Inner layer (24) is obtained in a hollow cylindrical form by winding the glass fiber onto a mandrel (not shown) at a 45° angle (eg 100 rpm). The outer layer (22) is obtained by winding the carbon fiber onto the inner layer (24), again at a speed of winding the inner layer (24), at an angle of 45°. Carried out experiments showed that a composite tube (20) where the ratio of glass fiber winding thickness (h1) to carbon fiber winding thickness (h2) and glass fiber and carbon fibers having different characteristic mechanical properties have an effective resistance against fatigue compared to other composite tubes. In FIG. 2b, winding thicknesses are designed differently. The ratio (h1/h2) of the carbon fiber winding thickness (h1) to the glass fiber thickness (h2) is selected as 0.1. In this case, too, the laminate thickness ratio provided an application in which the driveshaft twisting strength is sufficient compared to a two-part steel driveshaft and the natural bending frequency remains small.

In composite structures, including driveshaft tubes, the mechanical properties are mainly determined by the mechanical properties of the fibers and the orientation of the fibers within the tube. The fibers providing the best in strength, stiffness and cost have been selected in the driveshaft composite tube (20). The fiber orientation can be varied and calculated to provide the desired torque force and axial stiffness.

| REFERENCE NUMBERS |
|---|
| 10 Front joint |
| 12 Tube yoke |
| 14 Universal joint |
| 16 Flange yoke |
| 20 Composite tube |
| 22 Outer layer |
| 24 Inner layer |
| 30 Connection part |
| 32 Weld |
| 40 Rear joint |

The invention claimed is:

1. A driveshaft comprising:
an elongated monolithic composite tube with a front joint at one end of said elongated monolithic composite tube and a rear joint at an opposite end of said elongated monolithic composite tube, the front joint having a tube yoke, the rear joint being spaced by a distance from the front joint, said elongated monolithic composite tube having only an inner layer and an outer layer, the inner layer formed of glass fibers coaxially wound on top of one another, the outer layer wound directly on the inner layer, the outer layer being substantially formed of carbon fibers, wherein a ratio of thickness of the outer layer and a thickness of the inner layer is between 0.8-1.2.

2. The driveshaft of claim 1, wherein the outer periphery of said elongated monolithic composite tube is entirely on an outer facing side of the outer layer.

3. The driveshaft of claim 1, wherein the glass winding is a helical winding.

4. A method of manufacturing the driveshaft of claim 1 comprising:
fiber winding the inner layer so as to have a hollow cylindrical configuration;
filament twisting so as to create a winding thickness of the carbon fibers onto an outer side of the inner layer; and
securing the front joint and the rear joint along a connection part to the respective ends of said elongated monolithic composite tube.

5. The method of claim 4, wherein the thickness of the outer layer is substantially equal to the thickness of the inner layer.

\* \* \* \* \*